Nov. 16, 1926.  
C. DE GRAFF  
1,607,149  
COOKING UTENSIL  
Filed Dec. 14, 1925
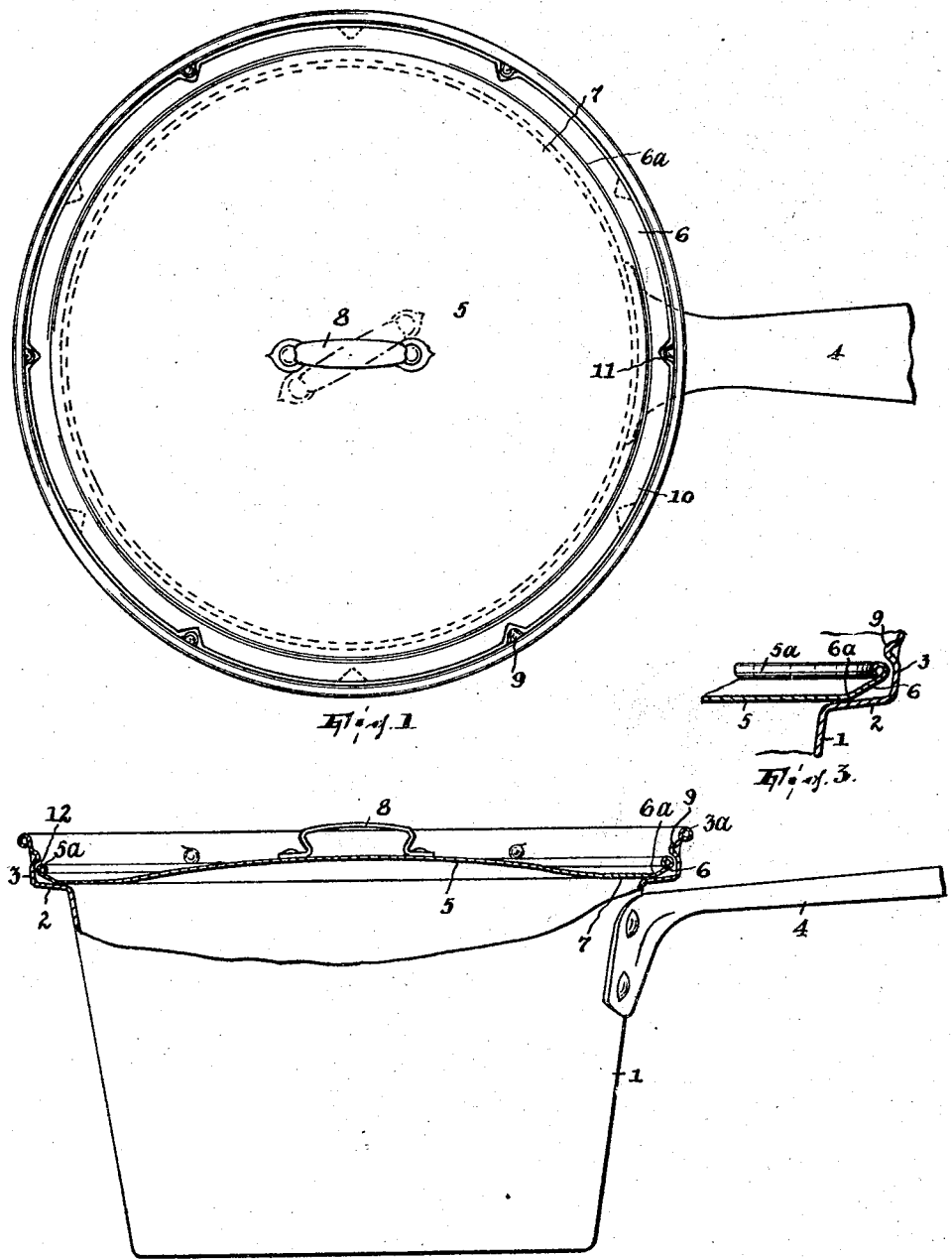
WITNESS  
Wm L. Bell.
INVENTOR  
Christopher De Graff,  
ATTORNEY Patented Nov. 16, 1926.

1,607,149

UNITED STATES PATENT OFFICE.

CHRISTOPHER DE GRAFF, OF NORTH HALEDON, NEW JERSEY.

COOKING UTENSIL.

Application filed December 14, 1925. Serial No. 75,263.

This invention relates to cooking utensils and in particular to pots, kettles and the like vessels having covers removable therefrom but adapted to be locked thereto so that when the vessel is tilted to drain its contents the cover will remain in place. The object of the invention is to provide a utensil of this class which shall be at once strong, durable and light in construction and yet inexpensive to manufacture, and which shall confine the heat as much as possible while the cooking is going on but whose construction will facilitate the draining of the vessel with the cover in place.

In the drawing,

Fig. 1 is a plan of the improved utensil;

Fig. 2 is a side elevation, partly in section; and

Fig. 3 is a section of a detail.

Both the vessel and its cover are preferably constructed of stamped sheet metal.

The vessel 1 is in the stamping formed near its open top or mouth with an outwardly flaring circumferential portion 2 which preferably slopes inwardly and downwardly all around and which forms a continuous seat for the cover, as will appear; one object of the sloping of the seat is to cause any liquid which might otherwise collect thereon to drain back into the vessel. Rising from this seat is an upstanding circumferential portion or rim 3, which may be wired as shown at 3$^a$. The vessel may have any suitable handle, as one, 4, of the rigid type riveted thereto and projecting radially therefrom.

The cover 5 is a disk which may be centrally bulged upwardly slightly in the conventional way. But its marginal portion 6 is flared upwardly somewhat in such a way that an obtuse but distinct angular bend exists in any radial section of the cover at 6$^a$ between this portion of the cover and the circumferential portion 7 thereof inwardly adjacent to said portion 6. This bend 6$^a$ is so situated that when the cover, which fairly snugly fits within the rim 3 of the vessel, is assembled with the vessel it rests on the seat 2. Further, the bend 6$^a$ then forms a single continuous line-contact with said seat, since both the portions 6 and 7 are then angularly related to the seat as viewed in any radial section of the assembled vessel and cover. The extreme edge of the cover may be wired, as indicated at 5$^a$. 8 is the handle of the cover.

For removably interlocking the assembled cover and vessel I construct them as follows: The vessel rim 3 has at regular intervals spaced projections 9 formed inwardly thereon, as by pressing from outside inward portions of the rim. The cover edge or margin has corresponding spaced projections 10, these being formed by providing notches 11 in the cover margin preferably of such size as to permit the cover when applied to or removed from the vessel with the notches in registry with the projections 9 of the vessel to clear these latter projections with a little clearance. Turning the cover, when seated on the seat 2, shifts the projections 10 into or out of interlocking relation to the projections 9. As seen in Fig. 2 at 12, the projections 10 are vertically spaced from the projections 9 where they register, allowing some upward movement of the cover from its seat. The notches 11 extend radially inwardly short of the angular bend 6$^a$ so that its line-contact with the seat 2 is uninterrupted.

The angular bend 6$^a$ materially reinforces the marginal portion of the cover. It also forms a continuous line-contact seal with the seat 2 so that when cooking is going on the heat is confined except at those intervals when the pressure of the steam actually becomes so great as to lift the cover from the seat. Since the seat is sloped inwardly any liquid that would otherwise collect there drains back into the vessel. When the vessel is to be drained it is tilted at a suitable angle and the liquid escapes between the cover and vessel, the then lowest notch facilitating the escape of the liquid; and for this purpose I preferably arrange the projections 9 so that on the cover being in interlocked position two of the notches, diametrically opposite, may be brought into position so that tilting the vessel one way or the other substantially on handle 4 as an axis will bring one of them in such lowest position.

Having thus fully described my invention what I claim and desire to secure by Letters Patent is:

A cooking utensil including, each formed of sheet metal, an open-top vessel and a cover therefor, the vessel having an outwardly flaring continuously inwardly sloping circumferential portion forming a seat and, rising therefrom, an upstanding rim, and the cover having its marginal portion flared upwardly and forming at the under side of the cover an uninterrupted circumferential angular bend resting normally in circumferentially uninterrupted sealing contact with the seat, and said rim having inward projections overhanging said marginal portion of the cover outward of its bend and spaced from but close thereto and the cover having notches in its marginal portion adapted on rotating the cover in its own plane to register with said projections and permit removal of the cover from the vessel.

In testimony whereof I affix my signature.

CHRISTOPHER DE GRAFF.